US008548872B1

(12) United States Patent
Gupta et al.

(10) Patent No.: US 8,548,872 B1
(45) Date of Patent: Oct. 1, 2013

(54) GENERATING PRODUCT FEEDS

(75) Inventors: Mohit Gupta, Bellevue, WA (US);
Swagath Kannan, Bellevue, WA (US);
Irfan M. Mohiuddin, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 232 days.

(21) Appl. No.: 13/015,658

(22) Filed: Jan. 28, 2011

(51) Int. Cl.
*G06Q 30/00* (2012.01)
(52) U.S. Cl.
USPC ..................... 705/26.41; 705/26.1
(58) Field of Classification Search
USPC .................... 705/26–27, 26.1–27.2
See application file for complete search history.

(56) References Cited

U.S. PATENT DOCUMENTS

| 2002/0147656 | A1* | 10/2002 | Tam et al. .................. 705/26 |
| 2007/0130090 | A1* | 6/2007 | Staib et al. ................. 705/400 |
| 2008/0167946 | A1* | 7/2008 | Bezos et al. ................ 705/10 |

OTHER PUBLICATIONS

Phillips, B., "Staying One Up on the Competition: Despite the Spotlight of Baseball/Softball Specialty Stores, Baum's Sporting Goods Has Maintained Its Top Market Position" (Sporting Goods Dealer, Jan./Feb. 2007, p. 36(2)).*

* cited by examiner

*Primary Examiner* — Jeffrey A Smith
*Assistant Examiner* — Ethan D Civan
(74) *Attorney, Agent, or Firm* — Thomas | Horstemeyer, LLP

(57) ABSTRACT

Disclosed are various embodiments for generating product feeds associated with a product catalog for a third party site. Entries in a product feed that are associated with products that are in turn associated with a price that is below a threshold specified by a minimum advertised pricing restriction can be flagged. A hyperlink can be provided through which a user can add the product to a shopping cart in an electronic commerce system, which can allow the third party site to display pricing information for the product.

26 Claims, 6 Drawing Sheets

GENERATING PRODUCT FEEDS

BACKGROUND

Product feeds can be generated that contain information about products in a product catalog accessible to an electronic commerce system. Such product feeds can be transmitted to third party sites, such as a product aggregator site, which can display information about one or more products as well as information about how to purchase the products from an operator of the electronic commerce system. This information can include a hyperlink that directs a user on a client to a site provided by the electronic commerce system. Product manufacturers and/or distributors may impose minimum advertised pricing limitations on the operators of an electronic commerce system, which can prevent the operator of an electronic commerce system from showing pricing information about a product if it is below a threshold. Accordingly, these limitations can prevent the operator of an electronic commerce system from providing pricing information for certain products in a product feed that is provided to a third party site.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the disclosure facilitate the showing of pricing information for certain products on a third party site, such as on an aggregator site, that may be restricted and/or prohibited by minimum advertised pricing restrictions. Product manufacturers and/or distributors can often distribute products to a retailer under agreements whereby certain minimum advertised pricing restrictions must be followed by the retailer in order to sell the product via an electronic commerce system. These agreements can restrict the operator of an electronic commerce system from advertising to the public a price of certain products that is below a particular threshold. Minimum advertised pricing restrictions may not prevent the operator of an electronic commerce system from selling a product at a price below such a threshold, but these restrictions may call for the operator of an electronic commerce system to require a user of the electronic commerce system to take some additional action over and above viewing a product listing, such as adding the product to a shopping cart or following a check-out workflow to a certain point, in order to see a price that is below a minimum advertised pricing threshold.

Additionally, one way an operator of an electronic commerce system can generate traffic and product sales is to provide a product feed containing information about products available via the electronic commerce system to third party sites, which are also known as aggregator sites, affiliate sites and/or associate sites. These third party sites can provide a comparison shopping tool that allows users to compare retailer ratings, pricing, and other information from a variety of retailers via a user interface generated by the third party site. However, minimum advertised pricing restrictions may prevent the operator of the electronic commerce system from providing pricing information in a product feed that is in turn transmitted to a third party site, which can negatively affect the amount of traffic and sales realized from users of the third party site.

Figure 1:
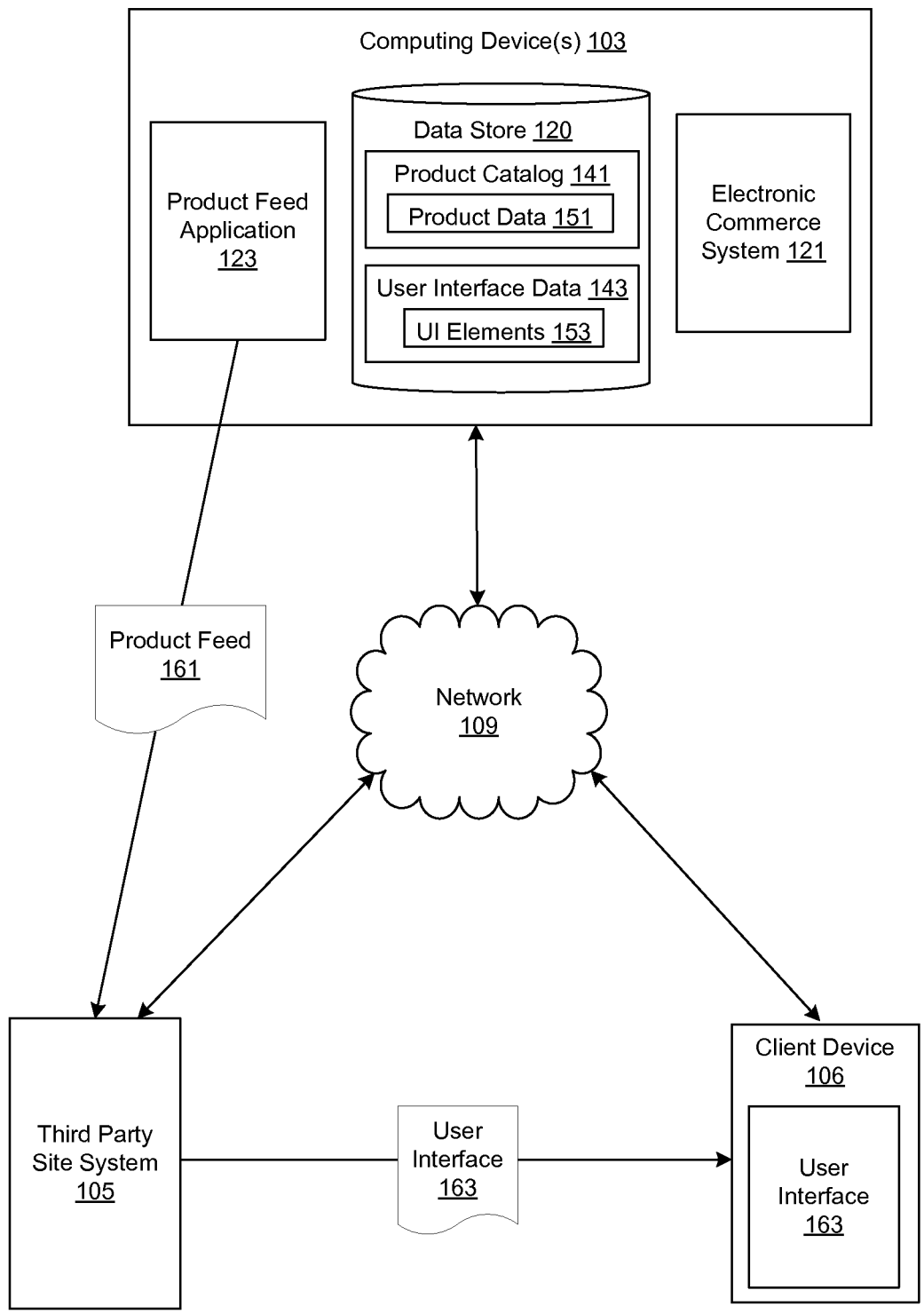
FIG. 1 is a drawing of a networked environment according to various embodiments of the present disclosure.

With reference to FIG. 1, shown is a networked environment 100 according to various embodiments. The networked environment 100 includes at least one computing device 103 that is in communication with at least one third party site system 105 and at least one client 106 over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above. Likewise, the at least one third party site system 105 can also be implemented in a computing device as described above.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include an electronic commerce system 121, a product feed application 123 and other applications, services, processes, systems, engines, or functionality not discussed in detail herein. The electronic commerce system 121 is executed in order to facilitate the viewing and/or purchasing of items and products over the network 109. Accordingly, the electronic commerce system 121 can allow a seller to set pricing for the various items and products as well as process payments submitted or authorized by users to make purchases. The electronic commerce system 121 can direct the shipment and/or delivery of products to a customer from a fulfillment center or the like. In some embodiments, the electronic commerce system 121 can process an order from a user on a client 106 and transmit order details to a seller for fulfillment of the order.

To this end, the electronic commerce system 121 can facilitate an electronic marketplace in which users can access products made available by sellers on various pricing, payment, and/or shipment terms. A user can browse various products available from various sellers via the electronic commerce system 121, and add products to a virtual shopping cart for later purchase. Various products in a virtual shopping cart can be fulfilled by various sellers and have various shipping terms and prices. The electronic commerce system 121 can access these various products from a product catalog that can be available in the data store 120 or other system in communication with the electronic commerce system 121. The electronic commerce system 121 can, in one embodiment, process payment for items in a virtual shopping cart and forward payment to the various sellers associated with the items purchased by the user. The electronic commerce system 121 also performs various backend functions associated with the online presence of a merchant in order to facilitate the online purchase of items by users in such a marketplace.

For example, the electronic commerce system 121 generates network pages, such as web pages or other types of network content, that are provided to client devices 106 in response to requests for the purposes of selecting items for purchase and to perform other tasks as will be described. In other embodiments, the electronic commerce system 121 facilitates the generating of data for display on a user interface rendered by another type of application executed on a client device 106. The electronic commerce system 121 can also include other functionality for facilitating online shopping, which is not discussed in detail herein.

The product feed application 123 can generate product feeds that contain information about products available via the electronic commerce system 121. As noted above, a product feed can be provided to a third party site, which can display information about products from the product feed. The third party site, in one embodiment, may comprise a product aggregator or a comparison shopping site that allows users to view information about a product that may be available from more than one retailer. For example, a user of such a third party site can view pricing, product ratings, seller ratings, and other information about a product that is available from multiple retailers. Accordingly, the product feed application 123 can generate a product feed that contains information about products that a third party site can extract and encode in a user interface for users of the third party site. Therefore, the product feed application 123 can generate a product feed 161 that includes information about one or more products from a product catalog.

A product feed 161 generated by the product feed application 123 may comprise a data structure that includes entries for various products from a product catalog. The entries associated with each product can include a product identifier, product pricing from a particular retailer and other information that can be displayed on a third party site. A product feed 161 can be represented by an extensible markup language (XML) data structure that includes various elements and/or sub-elements in which product data is encoded. In one embodiment, a product feed 161 can be represented by a JavaScript Object Notation (JSON) data structure in which product information is encoded.

The data stored in the data store 120 includes, for example, a product catalog 141, user interface data 143 and potentially other data. The product catalog 141 can include, for example, product data 151 that comprises information about products for display in a user interface generated by the electronic commerce system 121 for display on a client and/or insertion into a product feed generated by the product feed application 123. For example, the product data 151 can include product imagery, videos, descriptions, keywords, or other information about a product. Additionally, the product data 151 can include one or more product identifiers with which products in the product catalog 141 can be uniquely identified within the product catalog 141. As one example, the product data 151 can also include a product serial number, stock keeping unit, a globally unique identifier, or any other information with which a product can be identified.

The data store 120 can also include user interface data 143 that includes information about user interface elements 153 that can be used by the electronic commerce system 121 to generate a user interface. The user interface elements 153 can also be inserted by the product feed application 123 into a product feed 161 provided to a third party site. The user interface elements 153 can include page templates, imagery, video, and other elements. As one example, a user interface element can include an image as well as network page code associated with a button that can be placed in a user interface with which a user can add a product to a virtual shopping cart. In this example, the user interface data 143 can include any information and/or data associated with an "add to cart" user interface element that can be placed in a user interface generated by the electronic commerce system 121 and/or inserted into a product feed 161 generated by the product feed application 123.

The depicted table structure of the data store 120 is one example of how data can be structured therein according to embodiments of this disclosure, as it should be appreciated that data can be structured in many different ways across multiple data stores implemented in various computing devices. Data can be extracted by the product feed application 123 and/or electronic commerce system 121 by performing queries against data stored in the data store in wholly different table structures. Accordingly, it should be appreciated that the depicted data store 120 and the table structure shown therein is but one example given for ease of depiction and explanation of various embodiments of this disclosure.

Likewise, it should also be appreciated that the particular depiction of an electronic commerce system 121, a product feed application 123 executed in one or more computing devices 103 is but one example of an environment in which an embodiment of the disclosure can be implemented. It should be appreciated that an implementation according to an embodiment of the disclosure can be implemented in various ways, with the functionality described herein implemented in various application structures.

The third party site system 105 is representative of one or more computing devices in which a third party site can be implemented. As noted above, a third party site can include an aggregator site, a comparison shopping site at which a user can view information about a product that may be available from multiple retailers. A third party site can aggregate information about a product from various retailers, such as pricing information, and view the information from the various retailers in a user interface 163 that is generated by the third party site system 105 and transmitted to a client 106. As one example, a third party site system 105 can receive a product feed from various retailers that contains information about products available from the retailers. In one embodiment, products in a product feed can be indexed by a product identifier and/or a product model number. The third party site system 105 can then generate a user interface that displays a product along with pricing from various retailers and a hyperlink that links to a retailer site at which a user can view additional information about the product and/or purchase the product.

The user interface 163 generated by the third party site system 105 can include a network page, such as a web page, or any user interface data that can be rendered on a client. As an alternative example, the third party site system 105 can generate a user interface 163 that includes data that can be rendered with client side code executed in a client 106.

The client 106 is representative of a plurality of client devices that may be coupled to the network 109. The client 106 may comprise, for example, a processor-based system such as a computer system and/or mobile device. Such computer system may be embodied in the form of a desktop computer, a laptop computer, a personal digital assistant, a cellular telephone, set-top box, music players, web pads, tablet computer systems, game consoles, or other devices with like capability. The client 106 may be configured to execute various applications such as a browser and/or other applications. The browser may be executed in a client 106, for example, to access and render network pages, such as web pages, or other network content served up by the electronic commerce system 121, the third party site system 105 and/or other systems. A client 106 can also be configured to execute a special purpose application, such as a mobile application, which may include client side code that renders a user interface that includes data provided by another system. Although the specific implementation of a client 106 can vary, the client 106 is configured to render a user interface 163 generated by the third party site system 105 as described herein.

Certain components to facilitate embodiments of the disclosure may be implemented in one computing device 103, while other components may be implemented in a second computing device 103. The functionality discussed herein as occurring in one computing device 103 (as a non-limiting example) is but one example. For instance, a first computing device may execute software applications or components to facilitate generating a product feed 161, and a second computing device may execute software applications or components to facilitate the receiving and processing of orders in an electronic commerce system 121.

Next, a general description of the operation of the product feed application 123 is described. As noted above, minimum advertised pricing restrictions imposed by a product manufacturer, distributor, or other entity may prevent an operator of an electronic commerce system 121 from displaying pricing information in certain contexts if a product price is lower than a threshold. As one example, a minimum advertised pricing restriction may require that, in order to show a user a price that is lower than a threshold, the user add the product to a virtual shopping cart. As another example, such a restriction may require that the user follow a check-out workflow to a certain stage, such as a payment stage, in order to show a user a product price that is below a threshold.

Accordingly, third party sites often receive a product feed 161 from an operator of an electronic commerce system 121, and display pricing information that is included in such a product feed 161, a minimum advertised pricing restriction can prevent the product feed 161 from including pricing information for certain products if the price associated with an entry for a product is below a threshold. Therefore, in such a scenario, pricing information associated with a retailer that has priced certain products below a minimum advertised pricing restriction may not be displayed in a user interface 163 generated by a third party site system 105 and displayed on a client 106.

Accordingly, embodiments of the present disclosure can generate a product feed 161 that includes additional user interface elements by which a user can, in a user interface 163 generated by a third party site system 105, add a product to a virtual shopping cart in an electronic commerce system 121 or take some other action required by a minimum advertised pricing restriction in order to show the user the price of a product. In one embodiment, a product feed 161 generated by a product feed application 123 can flag entries in a product feed 161 for which a minimum advertised pricing restriction prohibits displaying a price to the user without the user adding the product to a shopping cart. These entries in a product feed 161 can include a hyperlink provided by the product feed application 123 in the product feed 161 by which the user can add a product to a virtual shopping cart in the electronic commerce system 121, thereby allowing the price to be shown to the user. In this example, the product feed 161 can include hyperlink references to imagery, network page code, or other user interface elements 153 that can be included in the user interface 163 generated by the third party site system 105 that can allow the user to add the product to a virtual shopping cart from within the user interface 163. In some embodiments, the product feed 161 can include a hyperlink that directs a user to a site associated with the electronic commerce system 121 rather than or in addition to a hyperlink that facilitates adding the product to a virtual shopping cart in the electronic commerce system 121.

Figure 2:
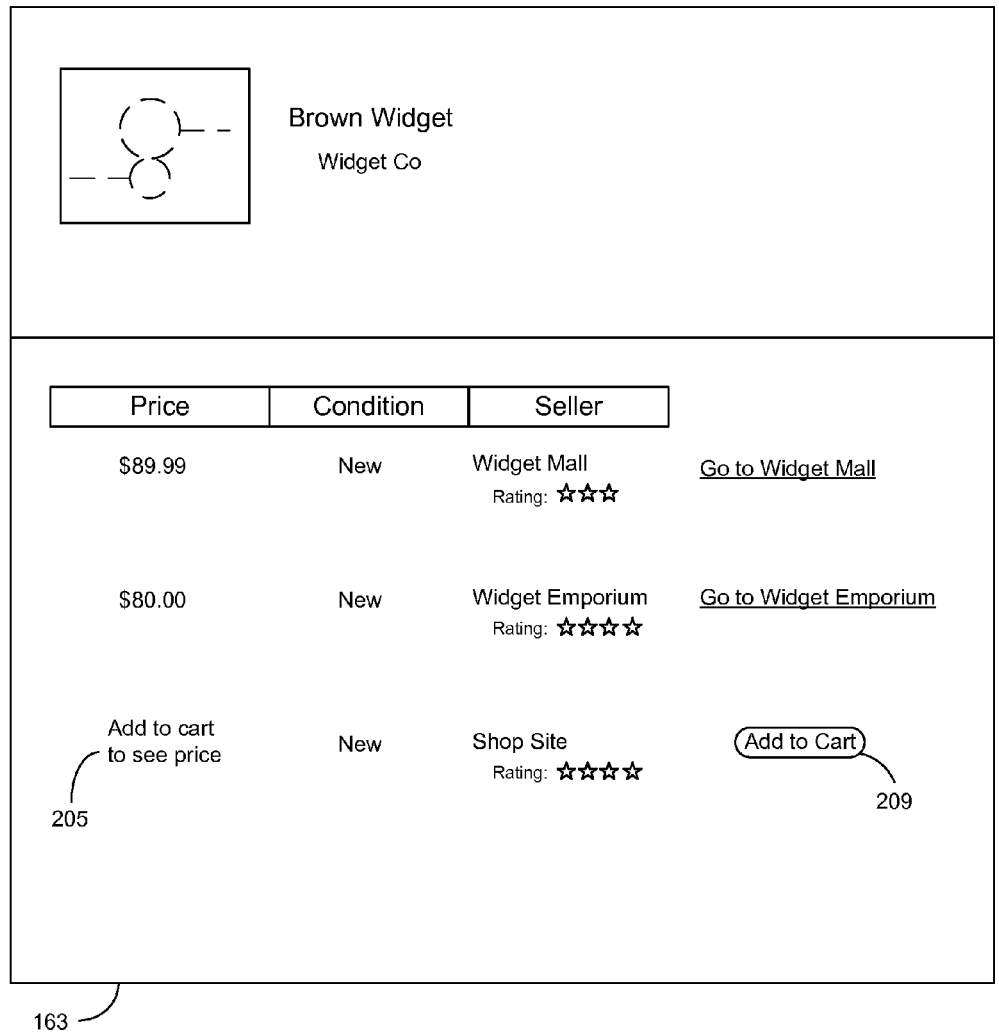
FIGS. 2-4 are drawings of example user interfaces rendered by a client in the networked environment of FIG. 1 according to various embodiments of the present disclosure.
Figure 3:
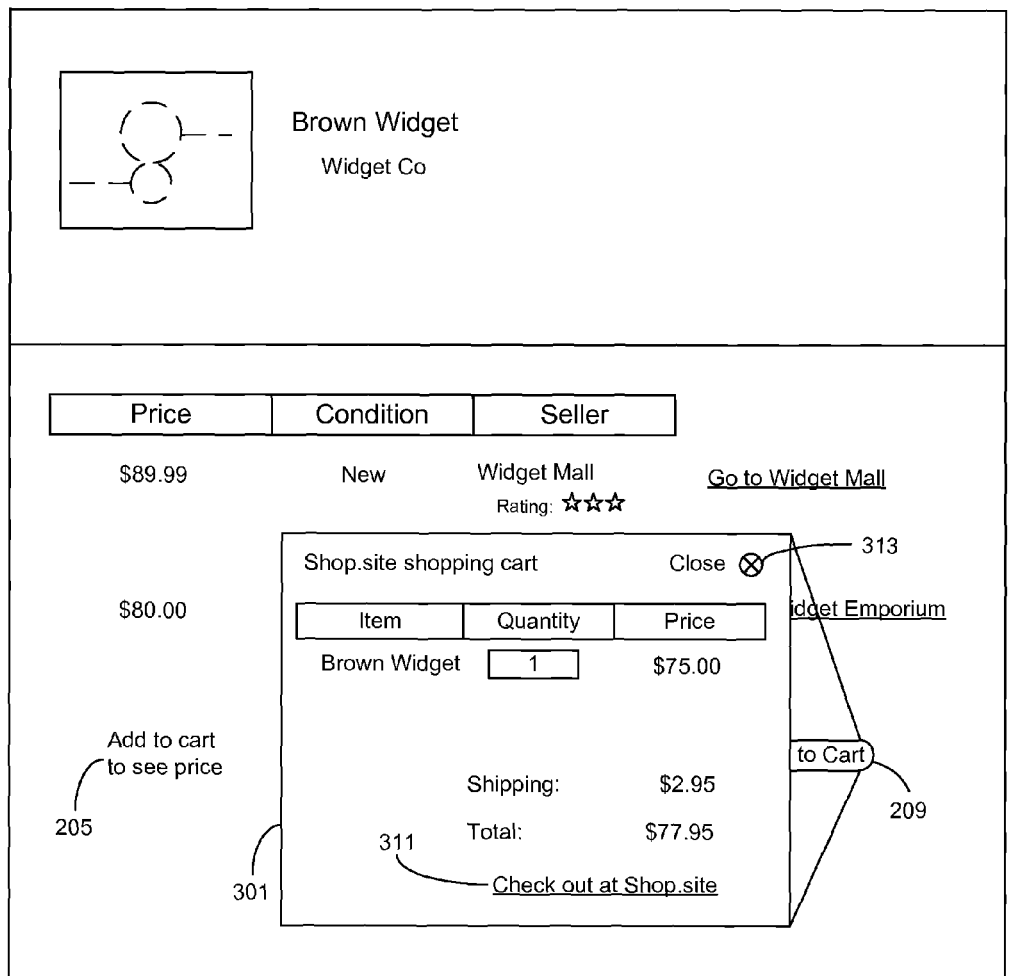
Figure 4:
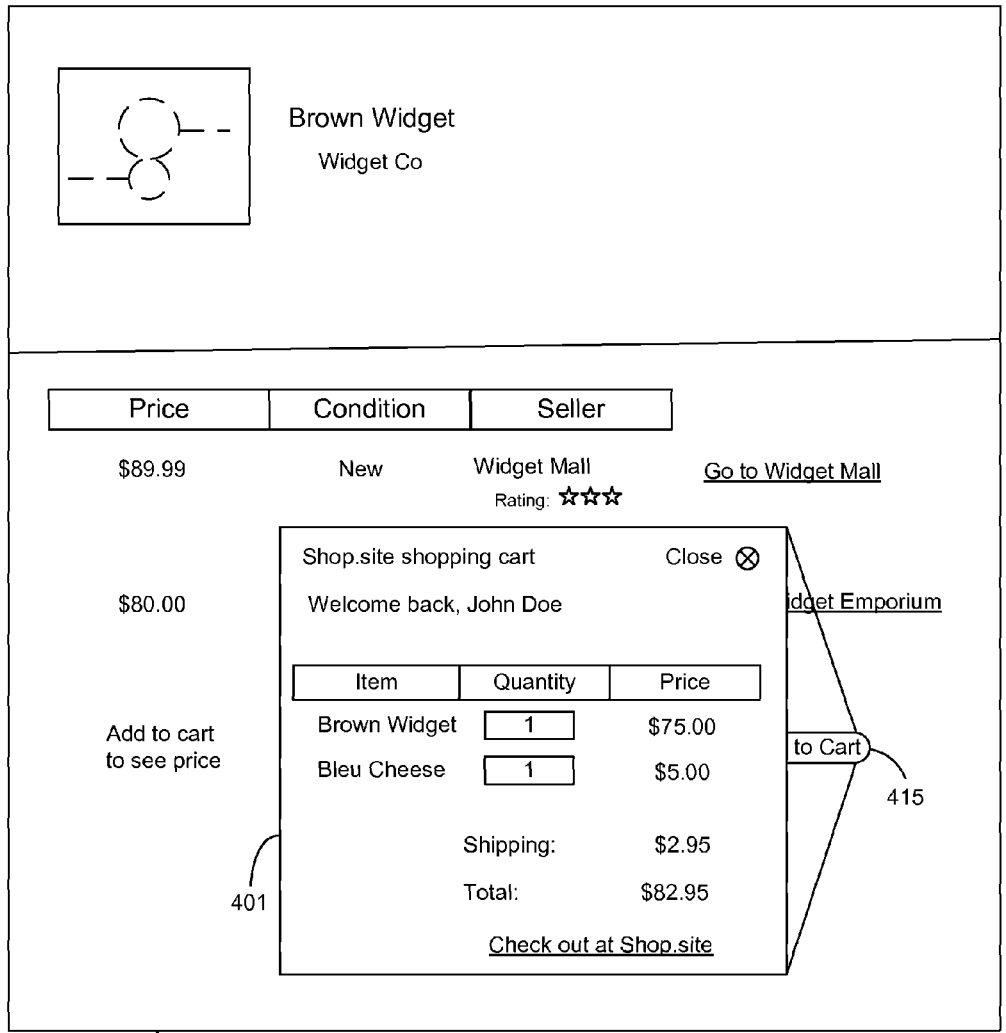

Referring next to FIGS. 2-4, shown are example user interfaces 163 that can be generated by the third party site system 105 that include information from a product feed 161 generated by the product feed application 123. The examples in FIGS. 2-4 illustrate various examples of how a product feed 161 generated by the product feed application 123 can allow a user to view pricing information of a product subject to a minimum advertised pricing restriction in a user interface 163 on a third party site. The depicted user interface 163 examples can be generated by a third party site by aggregating product feeds from various retailers that includes product information that can be displayed to a user. The example user interfaces 163 shown in FIGS. 2-4 are non-limiting examples shown to illustrate the functionality of the product feed application 123, and it should be appreciated that user interfaces generated according to an embodiment of the disclosure can vary.

FIG. 2 illustrates a user interface 163 that can be generated by a third party site that is a shopping comparison tool. The depicted user interface 163 can include information about a product that is available from multiple retailers. In the depicted example, the user interface 163 displays a price associated with the product as well as, in some cases, a hyperlink that a user can follow which takes the user to a site associated with the retailer, where the user can view additional information about the product. In the depicted example, the product shown in the user interface is subject to a minimum advertised pricing restriction. Accordingly, an entry associated with the product in a product feed 161 generated by the product feed application 123 can include a flag or other indicator alerting the third party site that product pricing cannot be displayed in the user interface 163 without the user adding the product to a virtual shopping cart associated with a retailer.

Accordingly, the flag or other indicator associated with the product entry in the product feed 161 can cause the third party site to display an add to cart indicator 205 to the user in the user interface 163. Such an indicator can instruct the user that he or she must add the product to a virtual shopping cart in order to view product pricing information. The indicator can include text that is embedded in an entry of the product feed 161 corresponding to the displayed product, and can vary from product to product. The indicator can also include a reference to a user interface element, such as an image, that is stored in the data store 120 and referenced by a hyperlink from the user interface 163. The product feed 161 can include a hyperlink generated for a particular product entry in the feed that, if followed, adds the product to a virtual shopping cart in an electronic commerce system. Such a hyperlink can be extracted by the third party site from the product feed 161 and encoded in the user interface 163 generated by the third party site. In this way, the user can add the product to a virtual shopping cart accessible to the electronic commerce system 121 from within the user interface 163 generated by the product feed application 123, and without having to visit the retailer's site. Therefore, product pricing can be displayed to the user within the user interface 163, which is illustrated in FIGS. 3 and 4.

The product feed application 123 and/or electronic commerce system 121 can also authenticate a third party site show that the depicted functionality can be selectively provided to third party sites. In one embodiment, a domain name, internet protocol (IP) address, or other information about the third party site from which a request via the hyperlink is received can be authenticated against a list of approved third party sites.

Reference is now made to FIG. 3, which illustrates an example user interface 163 generated by a third party site and/or an electronic commerce system 121 associated with the retailer in which product pricing can be displayed even if the product is subject to a minimum advertised pricing restriction. In the depicted example, the third party site user interface 163 can, when a user follows a hyperlink provided in a product feed 161 adds the product to a virtual shopping cart, include a container 301 in which product pricing is displayed via a shopping cart confirmation that can be generated by the electronic commerce system 121. The container 301 in the user interface 163 can also include additional information retrieved from the electronic commerce system 121, such as imagery for user interface elements and any data that associated with the virtual shopping cart in the electronic commerce system 121.

In the depicted example, the hyperlink associated with the add to cart button 209 can cause the product displayed in the user interface 163 to be added to an anonymous shopping cart in the electronic commerce system 121. In one embodiment, the user can follow a check-out hyperlink 311 or other user interface element that can direct the user to a site facilitated by the electronic commerce system 121, where the user can check out and/or purchase the product. If or when the user visits a site facilitated by the electronic commerce system 121, the electronic commerce system 121 can be configured to merge the contents of the anonymous shopping cart generated via the hyperlink with a shopping cart associated with an account of the user in the electronic commerce system 121 when the user provides user credentials.

In some embodiments, an entry in the product feed 161 corresponding to the displayed product can also include a hyperlink that removes the item from a virtual shopping cart in the electronic commerce system 121. Accordingly, if a user closes a window displaying the virtual shopping cart by activating the depicted close button 161, the user interface 163 can initiate a request to the hyperlink that removes the item when the user closes the displayed window.

Reference is now made to FIG. 4, which illustrates an example user interface 163 generated by a third party site and/or an electronic commerce system 121 associated with the retailer in which product pricing can be displayed even if the product is subject to a minimum advertised pricing restriction. In the depicted example, the third party site user interface 163 can, when a user follows a hyperlink provided in a product feed 161 adds the product to a virtual shopping cart, include a container 401 in which product pricing is displayed. As described above, the container 401 in the user interface 163 can also include additional information retrieved from the electronic commerce system 121, such as imagery for user interface elements and any data that associated with the virtual shopping cart in the electronic commerce system 121.

FIG. 4 also illustrates an example of how an identity of the user can be detected so that the product added to the user's virtual shopping cart associated with the user's account in the electronic commerce system 121. In one embodiment, the product feed 161 can include network page code that can be included in the container 401 and that detects whether a browser cookie or other persistent user identifier is present in the client 106 that is associated with a user account in the electronic commerce system 121. If such a cookie or other identifier is detected by the network page code provided by the product feed application 123 and embedded in the product feed 161 provided to the third party site, the electronic commerce system 121 can identify an account of the user and add the product to the user's virtual shopping cart if or when the add to cart hyperlink 415 is followed.

Figure 5:
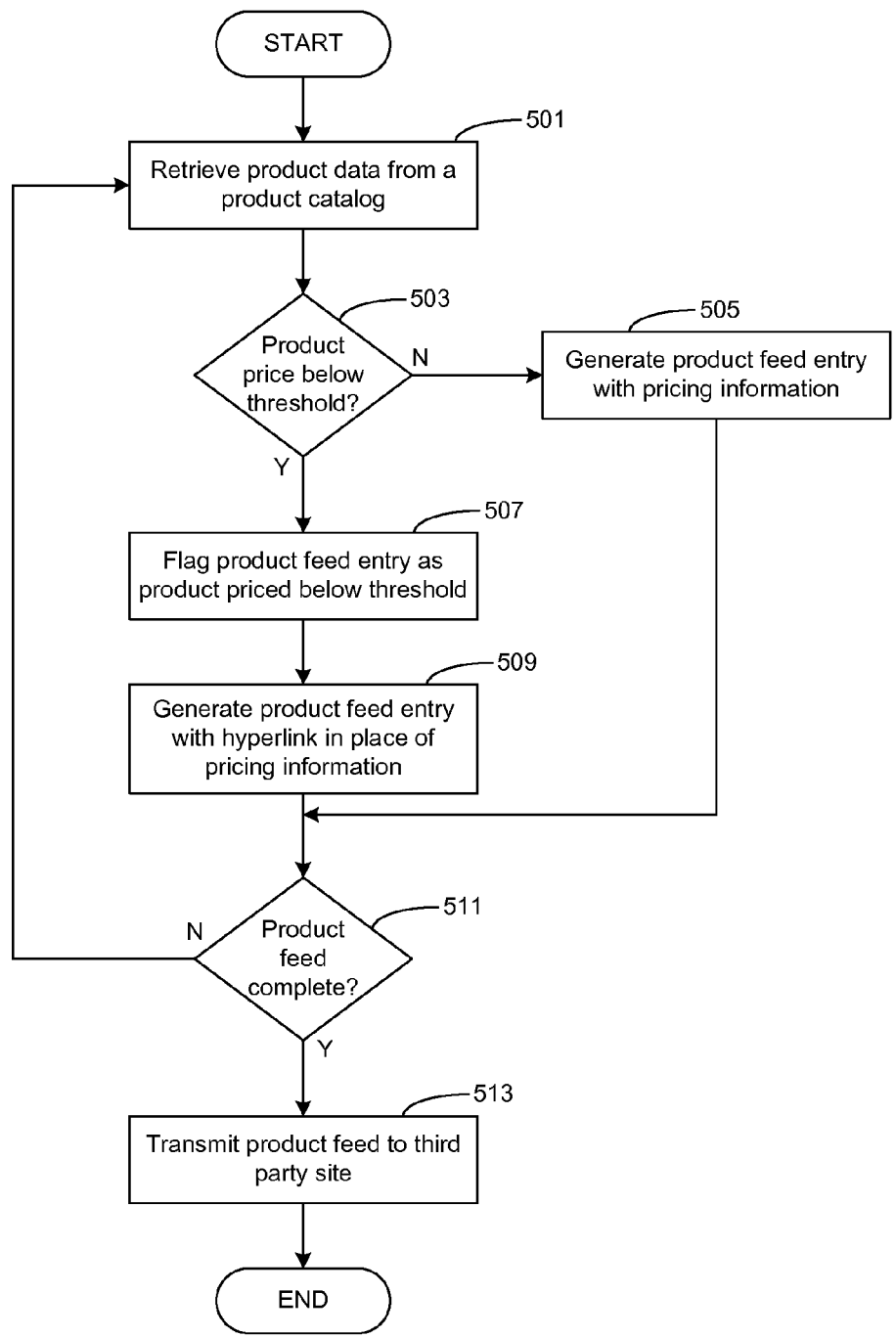
FIG. 5 is a flowchart illustrating one example of functionality implemented as portions of the product feed application executed in a computing device in the networked environment of FIG. 1 according to various embodiments of the present disclosure.
Figure 6:
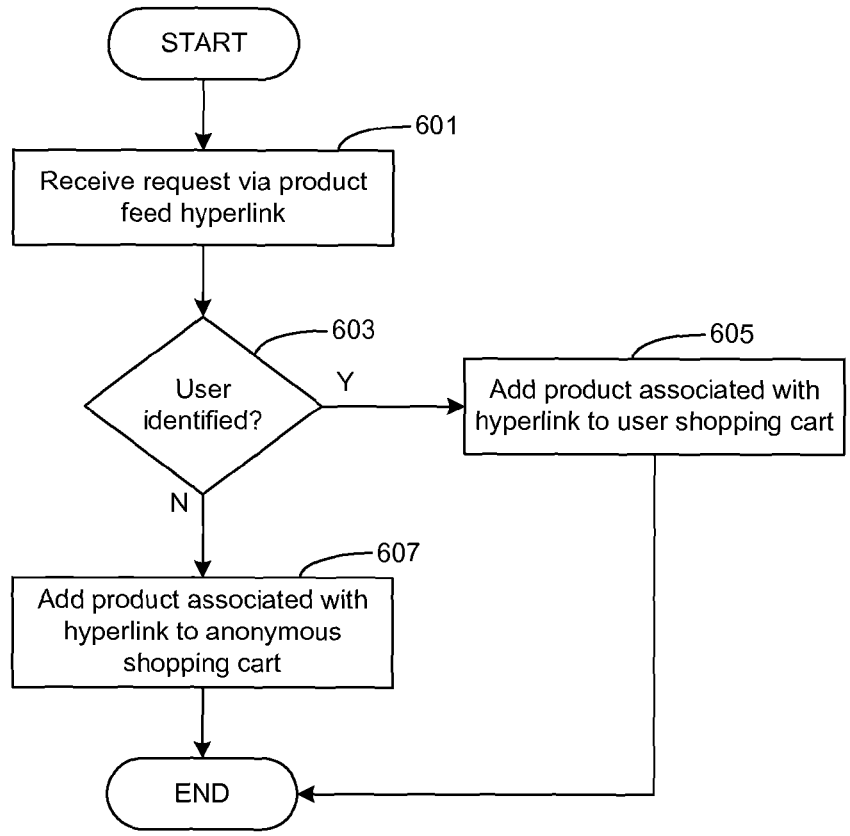
FIG. 6 is a flowchart illustrating one example of functionality implemented as portions of the product feed application executed in a computing device in the networked environment of FIG. 1 according to various embodiments of the present disclosure.

Referring next to FIGS. 5-6, shown are flowcharts that provides examples of the operation of a portion of the product feed application 123 and/or electronic commerce system 121 according to various embodiments. It is understood that the flowcharts of FIG. 5-6 provide merely examples of the many different types of functional arrangements that may be employed to implement the operation of the portion of the product feed application 123 and/or electronic commerce system 121 as described herein. As an alternative, the flowcharts of FIG. 5-6 may be viewed as depicting examples of steps of a method implemented in the computing device 103 (FIG. 1 according to one or more embodiments.

FIG. 5 illustrates one way in which a product feed can be generated according to embodiments of the disclosure. Beginning in box 501, the product feed application 123 can retrieve product data, such as product pricing, data about a minimum advertised pricing restriction, product identifiers, and other information that can be included in a product feed 161. In box 503, the product feed application 123 can determine whether a price associated with a product is below a threshold specified by a minimum advertised pricing restriction. If the price is not below the threshold, then an entry in the product feed associated with the product can be generated with pricing information in box 505.

If the price associated with the product is below a threshold specified by a minimum advertised pricing restriction, then the product feed application 123 flags an entry in the product feed 161 associated with the product as one that includes a product priced below the threshold. In box 509, the product feed application 123 can generate an entry in the product feed 161 associated with the product that includes a hyperlink that facilitates adding the product to a virtual shopping cart in an electronic commerce system 121 in place of the product pricing information. In box 511, the product feed application 123 can determine whether generation of the product feed 161 is complete, at which time the product feed 161 can be provided to a third party site in box 513.

In some embodiments, rather than flagging an entry in the product feed 161 and providing a hyperlink that facilitates adding the product to a virtual shopping cart in an electronic commerce system 121, the product feed application 123 can display a minimum advertised price, even if actual pricing for a product is below a minimum advertised pricing threshold. In other embodiments, the product feed application 123 can include the minimum advertised price as well as a hyperlink facilitating adding the product to a virtual shopping cart, and a third party site can display one or both.

FIG. 6 illustrates one example of the behavior of the electronic commerce system 121 when a request via a hyperlink provided in a product feed 161 associated with a product subject to a minimum advertised pricing restriction is received. A hyperlink provided in a product feed 161 by a product feed application 123 can include a request to the electronic commerce system 121 to add the product associated with an entry in a product feed 161 to a virtual shopping cart so that product pricing can be displayed. Accordingly, in box 601, the electronic commerce system 121 can receive a request via a product feed 161 hyperlink. In box 603, the electronic commerce system 121 can determine whether an account associated with a user that is in turn associated with a client 106 on which the hyperlink is followed can be identified. As described above, the electronic commerce system 121 can determine whether a browser cookie or other persistent user identifier is present in the client 106 on which the hyperlink is followed.

Accordingly, if the user can be identified, then in box 605, the product is added to a virtual shopping cart in the electronic commerce system 121 associated with the user's account. If the user cannot be so identified, then in box 607, the product is added to an anonymous shopping cart. As noted above, the electronic commerce system 121 can merge the contents of such an anonymous shopping cart if the user later visits a site facilitated by the electronic commerce system 121 and provides credentials from which the electronic commerce system 121 can identify a user account.

Figure 7:
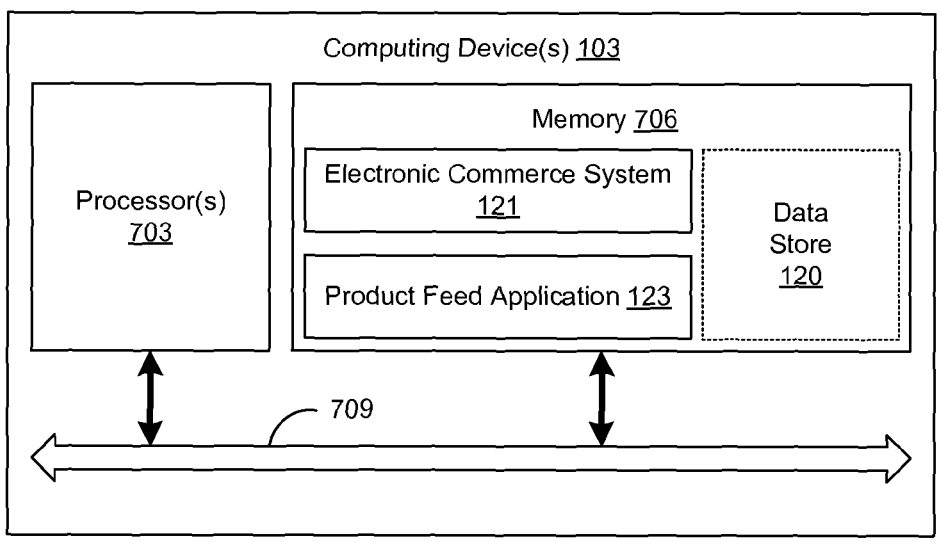
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the electronic commerce system 121, the product feed application 123, and potentially other applications. Also stored in the memory 706 may be a data store 120 and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the electronic commerce system 121, the product feed application 123 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 5-6 show the functionality and operation of an implementation of portions of the product feed application 123 and/or electronic commerce system 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 121, the product feed application 123, that comprise software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that generates a product feed associated with a plurality of products in a product catalog available via an electronic commerce system;
   code that retrieves a product from the product catalog;
   code that generates a product feed entry associated with the product;
   code that inserts a flag within the product feed in the product feed entry associated with the product when the product is associated with a price that is below a minimum advertised price threshold;
   code that generates a hyperlink within the product feed in the product feed entry, the hyperlink configured to cause the product to be added to a virtual shopping cart in the electronic commerce system;
   code that transmits the product feed to a third party site;
   code that receives a request from a client via the hyperlink within the product feed in the product feed entry, the request received in the electronic commerce system via the third party site;
   code that determines whether a user identifier is stored in the client, the user identifier being associated with a user account in the electronic commerce system;
   code that adds the product to a shopping cart associated with the user account in the electronic commerce system when the user account can be identified, the product added to an anonymous shopping cart in the electronic commerce system when the user account cannot be identified; and
   code that displays pricing information associated with the product in a third party site user interface in response to receiving the request from the client via the hyperlink within the product feed in the product feed entry and in response to the product being added to one of the shopping cart or the anonymous shopping cart in the electronic commerce system.

2. A system, comprising:
   at least one computing device; and
   a product feed application executable in the at least one computing device, the product feed application comprising:
      logic that identifies a plurality of products in a product catalog;
      logic that generates a product feed, the product feed including at least one attribute about each of the products;
      logic that populates the product feed with information about the products from the product catalog;
      logic that, in response to a product price associated with a product being below a minimum advertised price threshold, populates an entry in the product feed corresponding to the product with at least one hyperlink, the at least one hyperlink facilitating adding of the product to a shopping cart in an electronic commerce system;
      logic that sets a flag in the entry, the flag designating that a price associated with the corresponding to the entry is the minimum advertised price threshold; and
      logic that transmits the product feed to a third party site.

3. The system of claim 2, wherein the logic that generates the product feed further comprises logic that generates an extensible markup language (XML) data structure, the XML data structure comprising a plurality of elements, each of the elements corresponding to a product.

4. The system of claim 2, wherein the logic that populates the entry in the product feed corresponding to at least one of the products with at least one hyperlink further comprises logic that hides a price associated with the product from the product feed.

5. The system of claim 2, wherein the at least one hyperlink further comprises a product identifier that uniquely identifies a product in the product catalog accessible to the electronic commerce system.

6. The system of claim 2, wherein the at least one hyperlink further comprises at least one of a hyperlink to a product image associated with the product and at least one user interface image associated with the electronic commerce system.

7. The system of claim 2, wherein the product feed application further comprises:
logic that authenticates the third party site; and
logic that removes the hyperlink from the product feed when authentication of the third party site fails.

8. The system of claim 7, wherein the logic that authenticates the third party site further comprises:
logic that receives a request via the at least one hyperlink;
logic that identifies a domain associated with the third party site; and
logic that determines whether the domain is associated with an approved third party site.

9. The system of claim 2, wherein the product feed application further comprises:
logic that receives a request via the at least one hyperlink from the third party site;
logic that adds the product corresponding to the at least one hyperlink to a shopping cart in a data store accessible to the electronic commerce system; and
logic that transmits a shopping cart confirmation to the third party site, the shopping cart confirmation including the product price.

10. The system of claim 9, wherein the request via the at least one hyperlink is received from a user client, and the product feed application further comprises:
logic that identifies a cookie corresponding to the electronic commerce system in the user client;
logic that identifies a user account in the electronic commerce system corresponding to data stored within the cookie; and
logic that adds the product to a shopping cart associated with the user account.

11. The system of claim 2, wherein the product feed application further comprises:
logic that receives a request from at least one of the third party site or a client, the request received via the at least one hyperlink;
logic that generates a session corresponding to an anonymous user in the electronic commerce system;
logic that generates an anonymous shopping cart associated with the session; and
logic that adds the product associated with the at least one hyperlink to the anonymous shopping cart.

12. The system of claim 11, wherein the product feed application further comprises:
logic that receives credentials associated with a user associated with the client;
logic that retrieves a user shopping cart associated with the user in the electronic commerce system; and
logic that adds the product from the anonymous shopping cart to the user shopping cart.

13. A method, comprising:
generating, via at least one computing device, a product feed associated with a plurality of products in a product catalog;
retrieving, via the at least one computing device, data associated with at least one product from the product catalog;
generating, via the at least one computing device, a product feed entry associated with the at least one product;
flagging, via the at least one computing device, the product feed entry associated with the at least one product when the at least one product is associated with a price that is below a minimum advertised price threshold;
generating, via the at least one computing device, a hyperlink associated with the product feed entry, the hyperlink configured to cause the at least one product to be added to a virtual shopping cart in an electronic commerce system;
suppressing, via the at least one computing device, pricing information associated with the at least one product in the product feed entry; and
inserting, via the at least one computing device, the hyperlink in the product feed entry.

14. The method of claim 13, wherein the product feed further comprises an extensible markup language (XML) data structure, the XML data structure comprising a plurality of elements, each of the elements corresponding to a product from the product catalog.

15. The method of claim 13, further comprising hiding a price associated with the product from the product feed.

16. The method of claim 13, wherein the at least one hyperlink further comprises a product identifier that uniquely identifies a product in the product catalog accessible to the electronic commerce system.

17. The method of claim 13, wherein the at least one hyperlink further comprises at least one of a hyperlink to a product image associated with the product or at least one user interface image associated with the electronic commerce system.

18. The method of claim 13, further comprising:
transmitting, via the at least one computing device, the product feed to a third party site; and
authenticating, via the at least one computing device, the third party site.

19. The method of claim 18, further comprising:
receiving, via the at least one computing device, a request via the at least one hyperlink;
identifying, via the at least one computing device, a domain associated with the third party site; and
determining, via the at least one computing device, whether the domain is associated with an approved third party site.

20. The method of claim 12, further comprising:
receiving, via the at least one computing device, a request via the hyperlink from a third party site; and
adding, via the at least one computing device, the product corresponding to the at least one of the products to a shopping cart in a data store accessible to the electronic commerce system.

21. The method of claim 19, wherein the request via the hyperlink is received from a user client, and the method further comprises:
identifying, via the at least one computing device, a user identifier stored in the user client corresponding to the electronic commerce system;
identifying, via the at least one computing device, a user corresponding to data stored within a cookie; and adding, via the at least one computing device, the product to a shopping cart associated with an account of the user.

22. The method of claim 12, further comprising:

receiving, via the at least one computing device, a request from at least one of a third party site or a client, the request received via the hyperlink;

generating, via the at least one computing device, a session corresponding to an anonymous user in the electronic commerce system;

generating, via the at least one computing device, an anonymous shopping cart associated with the session; and adding, via the at least one computing device, the at least one product associated with the hyperlink to the anonymous shopping cart.

23. The method of claim 22, further comprising:

receiving, via the at least one computing device, credentials associated with a user associated with the client;

retrieving, via the at least one computing device, a user shopping cart associated with a session of the user in the electronic commerce system; and adding, via the at least one computing device, the product from the anonymous shopping cart to the user shopping cart.

24. A method, comprising:

receiving, in at least one computing device implementing a third party site, a product feed, the product feed comprising a plurality of entries corresponding to a plurality of products, each of the entries comprising at least one attribute associated with each of the plurality of products, wherein at least one of the entries is associated with a product having a price that is below a minimum advertised pricing threshold, the at least one of the entries including at least one hyperlink facilitating adding the product to a virtual shopping cart in an electronic commerce system, wherein the at least one hyperlink is inserted into the product feed in place of a price of the product;

encoding for display, via the at least one computing device, a user interface including at least one attribute associated with the product, the user interface including a user interface element that activates the at least one hyperlink;

receiving, in the at least one computing device, a shopping cart confirmation when the at least one hyperlink is activated; and encoding for display, via the at least one computing device, in response to receiving the shopping cart confirmation, a user interface element in the user interface that displays the price that is below the minimum advertised pricing restriction in response to the product being added to the virtual shopping cart in an electronic commerce system.

25. The method of claim 24, wherein the at least one hyperlink further comprises a hyperlink that facilitates removal of the product from the virtual shopping cart, and the method further comprises:

receiving, in the at least one computing device, a request from a user to close the user interface element; and transmitting, from the at least one computing device, a request to the electronic commerce system that facilitates removal of the product from the virtual shopping cart.

26. The method of claim 24, wherein the at least one hyperlink further comprises at least one user interface element hyperlink, the user interface element hyperlink associated with user interface elements associated with the electronic commerce system, and the step of encoding for display the user interface element further comprises the step of encoding for display the at least one user interface element hyperlink, wherein the at least one user interface element hyperlink is associated with at least one image obtained from the electronic commerce system.

* * * * *